United States Patent
Suzuki et al.

(10) Patent No.: US 11,073,947 B2
(45) Date of Patent: Jul. 27, 2021

(54) TOUCH PANEL DEVICE

(71) Applicant: KDDI CORPORATION, Tokyo (JP)

(72) Inventors: Masahiro Suzuki, Tokyo (JP); Tomoaki Ueda, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/641,322

(22) PCT Filed: Sep. 12, 2018

(86) PCT No.: PCT/JP2018/033779
§ 371 (c)(1),
(2) Date: Feb. 24, 2020

(87) PCT Pub. No.: WO2019/059061
PCT Pub. Date: Mar. 28, 2019

(65) Prior Publication Data
US 2020/0387261 A1 Dec. 10, 2020

(30) Foreign Application Priority Data
Sep. 25, 2017 (JP) .............................. JP2017-183387

(51) Int. Cl.
*G06F 3/043* (2006.01)
*G06F 3/042* (2006.01)
(Continued)

(52) U.S. Cl.
CPC ............ *G06F 3/0421* (2013.01); *G06F 3/044* (2013.01); *G06K 9/0004* (2013.01); *G02B 6/0011* (2013.01)

(58) Field of Classification Search
CPC ..... G02B 6/0011; G06F 3/042; G06F 3/0421; G06F 3/044; G06K 9/0004
See application file for complete search history.

(56) References Cited

U.S. PATENT DOCUMENTS 10,175,822 B2  1/2019 Dearn et al.
2009/0219253 A1  9/2009 Izadi et al.
(Continued)

FOREIGN PATENT DOCUMENTS

JP  2010-55349 A  3/2010
JP  2011-513828 A  4/2011
(Continued)

OTHER PUBLICATIONS

International Search Report (ISR) issued in International Patent Application No. PCT/JP2018/033779, dated Oct. 9, 2018.

*Primary Examiner* — Insa Sadio
(74) *Attorney, Agent, or Firm* — Greenblum & Bernstein, P.L.C.

(57) ABSTRACT

A touch panel device according to an embodiment of the present invention is provided with: a panel having a contact surface for receiving a contact; a light emitting portion that inputs, to the panel, input light that is transmitted through the panel; a light receiving portion that detects output light including reflected light of evanescent light that has been generated, on the contact surface, from the input light; and a control portion that calculates and outputs a contact position on the basis of the output light detected by the light receiving portion and a relationship, stored in advance, between positions on the contact surface and the output light.

12 Claims, 6 Drawing Sheets

(51) Int. Cl.
   *G06F 3/044* (2006.01)
   *G06K 9/00* (2006.01)
   *F21V 8/00* (2006.01)

(56) References Cited

U.S. PATENT DOCUMENTS

| | | |
|---|---|---|
| 2010/0053227 A1 | 3/2010 | Yamaguchi et al. |
| 2013/0285977 A1* | 10/2013 | Baharav ................ G06F 3/0428 345/174 |
| 2017/0031527 A1* | 2/2017 | Dearn ..................... G06F 3/042 |

FOREIGN PATENT DOCUMENTS

| | | |
|---|---|---|
| JP | 2014-85824 A | 5/2014 |
| JP | 2015-521313 A | 7/2015 |
| JP | 2017-510928 A | 4/2017 |
| JP | 2017-102851 A | 6/2017 |
| WO | 2009/110951 A1 | 9/2009 |
| WO | 2013/165749 A1 | 11/2013 |
| WO | 2015/155508 A1 | 10/2015 |

\* cited by examiner

TOUCH PANEL DEVICE

TECHNICAL FIELD

The present invention relates to a touch panel device that detects a position on a screen touched by a user.

Priority is claimed on Japanese Patent Application No. 2017-183387, filed Sep. 25, 2017, the content of which is incorporated herein by reference.

BACKGROUND ART

Conventionally, in mobile terminals and personal computers, touch panels are widely employed that detect a position on a screen touched by a user (hereinafter, referred to as a "contact position"), thereby enabling various operations. Various detection methods, such as an infrared method and a capacitance method, are known as techniques for a touch panel to detect a contact position.

Patent Document 1 discloses a technique for detecting the contact position by arranging a light emitting element that emits infrared light along an edge of a screen of a touch panel, arranging a light receiving element so as to face the light emitting element, and detecting the blocking of the infrared light from the light emitting element to the light receiving element.

PRIOR ART DOCUMENTS

Patent Documents

[Patent Document 1] Japanese Unexamined Patent Application, First Publication, No. 2014-85824

DISCLOSURE OF THE INVENTION

Problems to be Solved by the Invention

For digital signage (electronic signboards) and the like, a large-sized display device capable of detecting a contact position by incorporating a touch panel has been developed. However, an infrared-type touch panel such as the technology described in Patent Document 1 requires a large number of light emitting elements and light receiving elements to be arranged along the edge of the screen, and so increasing the size becomes costly.

In addition, since a capacitance-type touch panel requires one or more transparent electrode layers, a substantial cost is required to increase the size. Further, since the transmittance of light decreases due to the presence of the electrode layer and an adhesive layer, the power consumption of the backlight of the display device increases to offset the lower brightness. In addition, since a resistive film type touch panel requires an electrode layer and a film for detecting contact on the surface, the light transmittance also decreases.

The present invention has been made in view of these points, and an object of the present invention is to provide a low-cost touch panel device having high light transmittance.

Means for Solving the Problems

The touch panel device according to one aspect of the present invention is provided with: a panel having a contact surface for receiving a contact; a light emitting portion that inputs, to the panel, input light that is transmitted through the panel; a light receiving portion that detects output light including reflected light of evanescent light that has been generated, on the contact surface, from the input light; and a control portion that calculates and outputs a contact position where a contact was received on the contact surface on the basis of the intensity of the output light detected by the light receiving portion and a relationship, stored in advance, between positions on the contact surface and the intensity of the output light respectively corresponding thereto.

In the touch panel device, the light receiving portion may be provided with a plurality of light receiving elements, and the control portion may calculate a distance from each of the light receiving portions to the contact position using the intensity of the output light detected by each of the plurality of light receiving elements, and calculate the contact position using the plurality of distances related to the plurality of light receiving elements.

In the touch panel device, the control portion may calculate the contact position using a value of an intensity change obtained by subtracting the intensity when the light emitting portion is not emitting the input light from the intensity when the light emitting portion is emitting the input light.

In the touch panel device, the light receiving portion may be a camera that obtains an image by capturing the reflected light, and the control portion may calculate the contact position from the image acquired by the camera.

In the touch panel device, the control portion may detect a fingerprint of the contact from the image acquired by the camera, and may output the fingerprint along with the contact position.

In the touch panel device, the light emitting portion may emit the input light having a wavelength of 0.78 μm or more and less than 1000 μm.

In the touch panel device, the light emitting portion may emit the input light having a plurality of wavelengths.

In the touch panel device, the control portion may determine the presence or absence of the contact on the basis of a magnitude of a change in the output light.

In the touch panel device, the control portion may determine the presence or absence of the contact on the basis of a time-series pattern of a change in the output light.

In the touch panel device, there may be further provided a capacitance measuring portion that measures the capacitance of the contact surface, and the control portion may determine the presence or absence of the contact on the basis of the capacitance measured by the capacitance measurement portion.

In the touch panel device, the light emitting portion may input the input light to an end surface surrounding the contact surface of the panel.

In the touch panel device, the light emitting portion may detect the output light output from the end surface opposite to the light emitting portion.

In the touch panel device, there may be further provided a display portion for displaying an image, the display portion extending along the panel with a gap therebetween, and the light receiving portion may detect the output light output from the gap between the panel and the display portion.

Advantageous Effects of the Invention

The present invention exhibits the effect of being able to realize a low-cost touch panel device having high light transmittance.

EMBODIMENTS FOR CARRYING OUT THE INVENTION

First Embodiment

Figure 1:
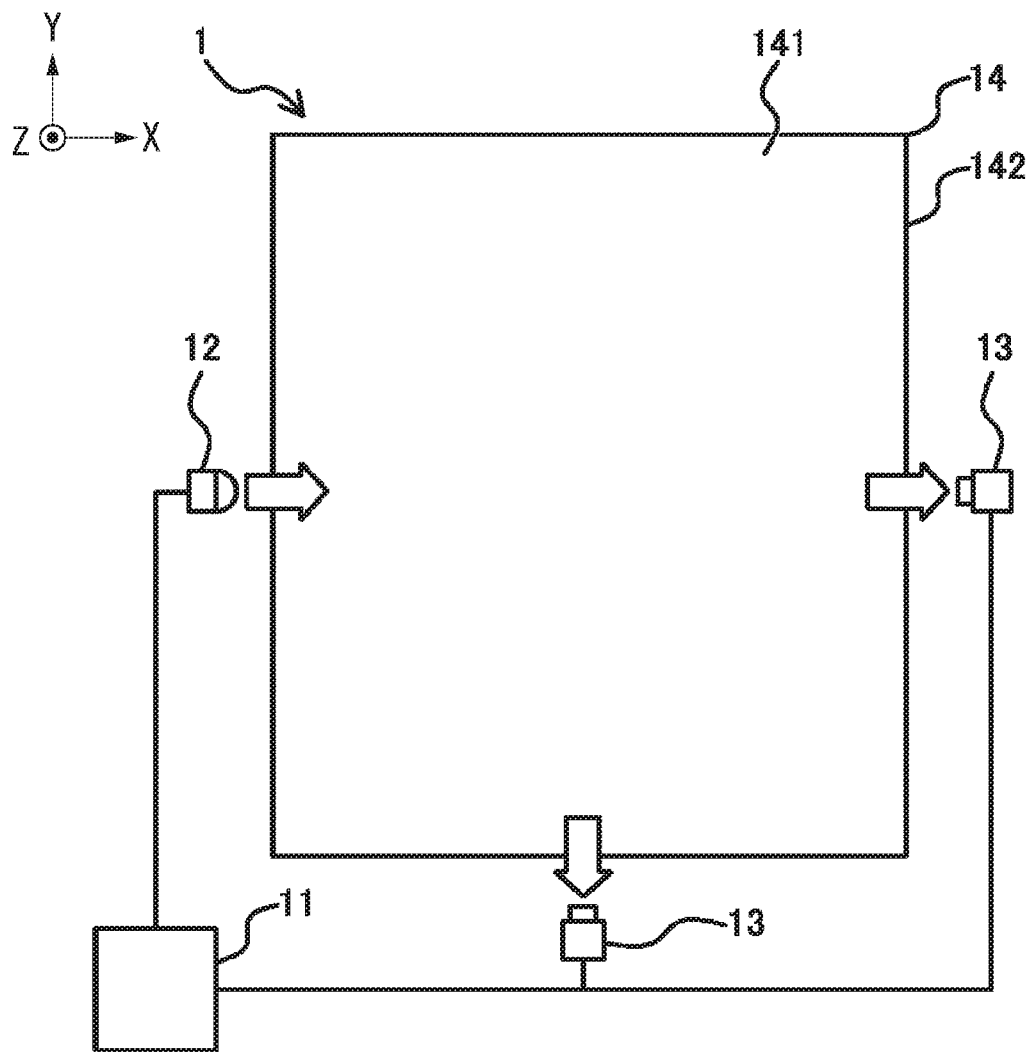
FIG. 1 is a front view showing a touch panel device according to a first embodiment.
Figure 2:
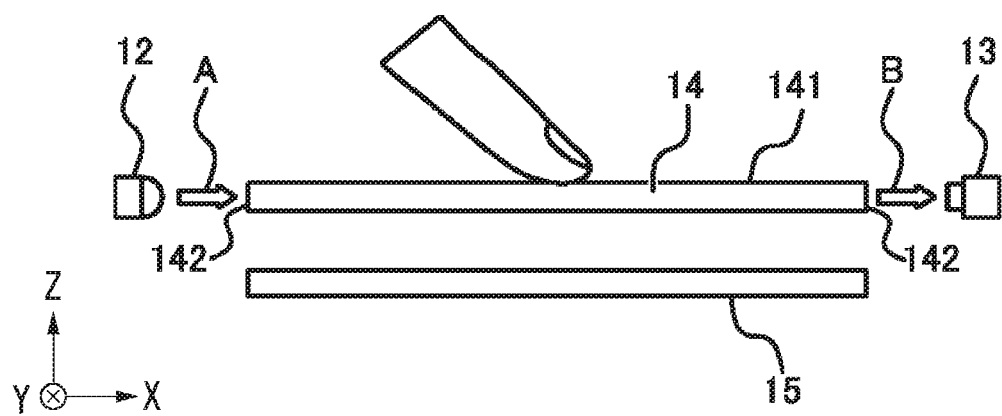
FIG. 2 is a side view showing the touch panel device according to the first embodiment.

FIG. 1 is a front view of a touch panel device 1 according to the present embodiment. FIG. 2 is a side view of the touch panel device 1 according to the present embodiment. In FIGS. 1 and 2, the size of each constituent member is adjusted for recognizability, and does not correspond to the actual size.

The touch panel device 1 is provided with a control portion 11, a light emitting portion 12, a light receiving portion 13, a panel 14, and a display portion 15. The control portion 11, the light emitting portion 12, the light receiving portion 13, the panel 14, and the display portion 15 are fixed to a housing (not shown).

The panel 14 is a plate that transmits light emitted from the light emitting portion 12 and the display portion 15. The panel 14 consists of a contact surface 141 that receives a contact (touch) by the user, and an end surface 142 surrounding the contact surface 141 and orthogonal to the contact surface 141. The panel 14 is made of a material, such as resin or glass, that is transparent to at least the wavelength of the input light emitted by the light emitting portion 12 and the wavelength of the visible light emitted by the display portion 15.

The light emitting portion 12 is connected to the control portion 11, and is arranged to face a Y-axis side of the panel 14. The light emitting portion 12 has a light emitting element that generates light having a predetermined wavelength (input light A) according to a control signal from the control portion 11. The light emitting portion 12 includes, for example, an LED (light emitting diode), an LD (laser diode), or the like as a light emitting element. The light emitting portion 12 is provided at a position where the input light A can be input to the end surface 142 on a side of the panel 14 in the Y-axis direction. In order to uniformly input the input light A to the panel 14, the light emitting portion 12 preferably has a light guide or a light guide plate between the end surface 142 of the panel 14 and the light emitting element.

The light receiving portion 13 is provided on a side in the Y-axis direction opposite the side on which the light emitting portion 12 of the panel 14 is provided and on a side in the X-axis direction orthogonal to the Y-axis. Each light receiving portion 13 is connected to the control portion 11 and has a light receiving element that detects light (output light B) from the end surface 142 of the panel 14 and transmits a signal indicating the intensity of the light to the control portion 11. The light receiving portion 13 has, for example, a PD (photodiode) as a light receiving element. In order to specify the contact position of the user on the panel 14 with high accuracy, it is desirable that each light receiving portion 13 has at least two light receiving elements arranged along opposing sides. Each light receiving portion 13 is provided at a position where the output light B from the end surface 142 of the panel 14 can be received. In order to suppress the influence of environmental light (disturbance light), it is desirable that the light receiving portion 13 has a polarizing filter between the end surface 142 of the panel 14 and the light receiving element.

The display portion 15 is connected to the control portion 11, and is provided on the rear side (in the Z-axis direction) of the panel 14 and in parallel with the panel 14. The display portion 15 includes an arbitrary display device, such as a liquid crystal display, capable of displaying various information in accordance with a control signal from the control portion 1. The display portion 15 displays an image to a user via the panel 14.

The control portion 11 controls the light emitting portion 12 to generate light, and calculates the contact position of the user based on the light received by each light receiving portion 13. The control portion 11 outputs the calculated contact position to the host system.

[Explanation of Touch Detection Method]

Figure 3A:
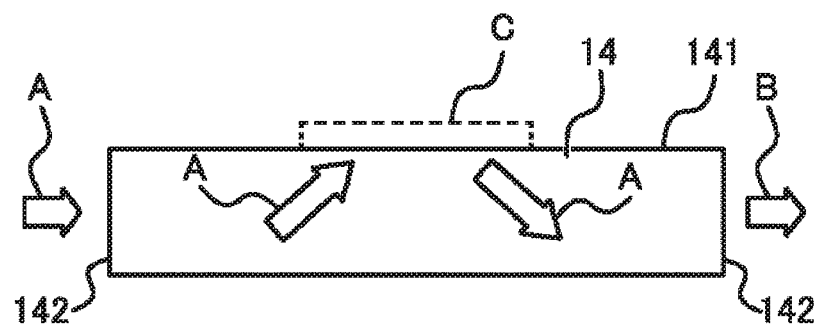
FIG. 3A is a side view showing a state in which the user is not touching the touch panel device according to the first embodiment.
Figure 3B:
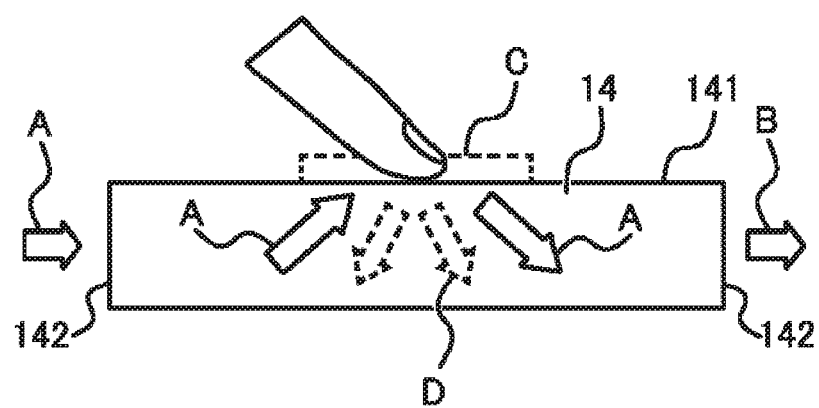
FIG. 3B is a side view showing a state in which the user is touching the touch panel device according to the first embodiment.

FIGS. 3A and 3B are schematic drawings of a touch detection method by the touch panel device 1 according to the present embodiment. FIG. 3A shows a state in which a user is not touching the panel 14.

In the case where the refractive indices of the inside and outside of a substance differ, when light passes through the inside of the substance, the light is known to be totally reflected when the light is incident at an angle of a predetermined value or greater on the interface of the inside and outside of the substance. In the touch panel device 1, the input light A input from the end surface 142 is repeatedly totally reflected at the interface between the panel 14 and the outside (that is, the atmosphere), and travels inside the panel 14. The input light A that is not totally reflected is transmitted to the outside of the panel 14 and diverges.

It is known that when light is totally reflected at an interface, evanescent light (also called an evanescent field) having a thickness of about one wavelength of the light is generated on the opposite side of the light with respect to the interface. Evanescent light is a light wave that propagates along the interface at the same frequency as the light that is totally reflected. The energy distribution of the evanescent light is limited to a region of about one wavelength (for example, several hundred nm) from the interface and is localized so as to cling to the interface. In the touch panel device 1, evanescent light C is generated by the totally reflected input light A in the vicinity of the contact surface 141 on the outer side the panel 14.

FIG. 3B shows a state where a user (here, a finger) is in contact with the panel 14. When the user touches or approaches the panel 14, the evanescent light C generated near the panel 14 is diffusely reflected by the surface of the user's finger to generate reflected light D. A part of the reflected light D of the evanescent light C travels while being totally reflected inside the panel 14 and reaches the light receiving portion 13, while the remainder diverges to outside the panel 14. For that reason, the light receiving portion 13 receives the output light B which includes the totally reflected input light A and the reflected light D of the evanescent light C. Accordingly, the intensity of the output light B received by the light receiving portion 13 fluctuates between the state shown in FIG. 3A and the state shown in FIG. 3B.

When the evanescent light is diffusely reflected, part of the energy of the input light A is lost, so that the intensity of the input light A in the output light B decreases while the intensity of the reflected light D is added to the output light B. For that reason, depending on the relationship between the light emitting portion 12, the light receiving portion 13, and the contact position, the case where the intensity of the output light B increases and the case where the output light B decreases are both possible. Accordingly, the intensity of the output light B changes depending on the contact position of the user on the contact surface 141.

The control portion 11 of the touch panel device 1 calculates the contact position of the user by comparing the intensity of the output light B received by the light receiving portion 13 with a relationship, stored in advance, between a plurality of positions and the respective intensities of the output light corresponding to those positions.

[Constitution of Touch Panel Device 1]

Figure 4:
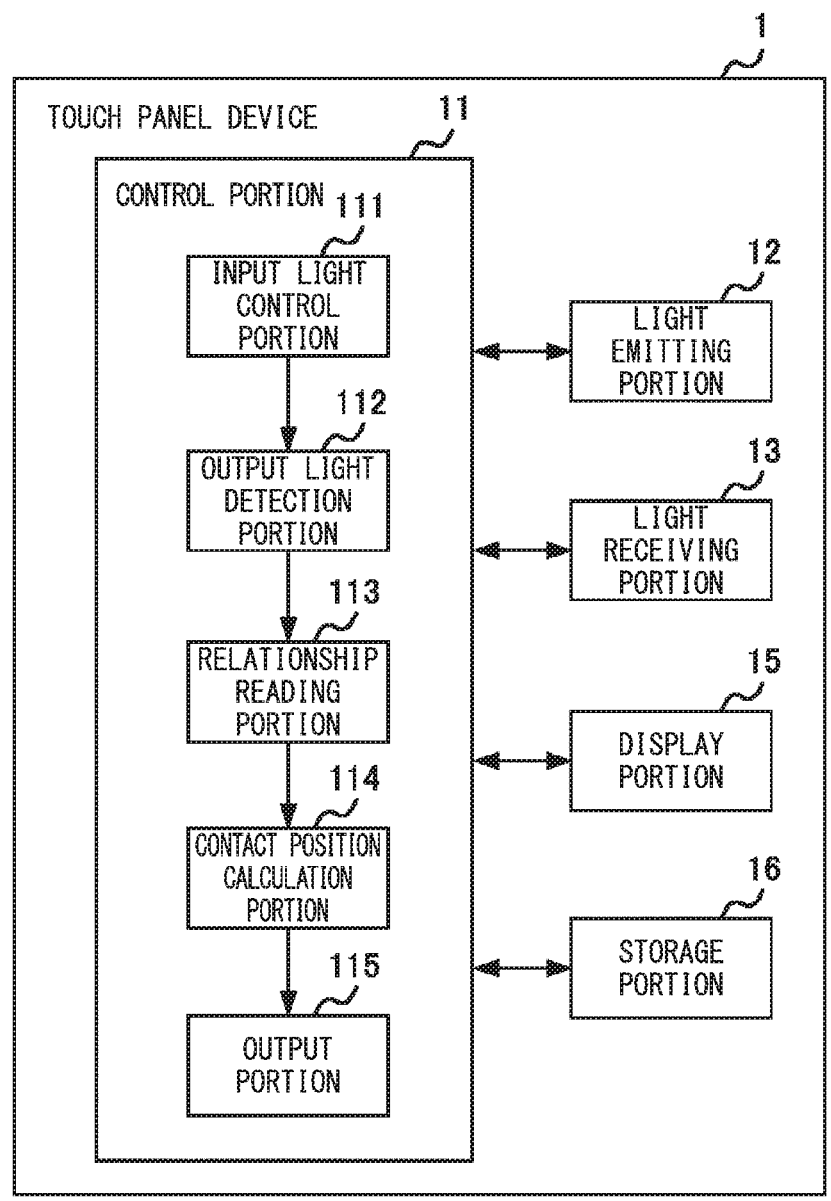
FIG. 4 is a block diagram showing the touch panel device according to the first embodiment.

FIG. 4 is a block diagram of the touch panel device 1 according to the present embodiment. In FIG. 4, arrows indicate main data flows, and there may be data flows other than those shown in FIG. 4. In FIG. 4, each block shows a configuration of a function unit, not a configuration of a hardware (device) unit. For that reason, the blocks shown in FIG. 4 may be implemented in a single device, or may be separately implemented in a plurality of devices. Transfer of data between blocks may be performed via any means such as a data bus, a network, a portable storage medium, and the like.

The touch panel device 1 includes a storage portion 16 in addition to the control portion 11, the light emitting portion 12, the light receiving portion 13, and the display portion 15 described above. The control portion 11 includes an input light control portion 111, an output light detection portion 112, a relationship reading portion 113, a contact position calculation portion 114, and an output portion 115.

The storage portion 16 is a storage medium including a ROM (Read Only Memory), a RAM (Random Access Memory), a hard disk drive, and the like. The storage portion 16 stores in advance a program to be executed by the control portion 11.

The control portion 11 is a processor such as a CPU (Central Processing Unit). The control portion 11 functions as the input light control portion 111, the output light detection portion 112, the relationship reading portion 113, the contact position calculation portion 114, and the output portion 115 by executing a program stored in the storage portion 16. At least some of the functions of the control portion 11 may be executed by an electrical circuit. Further, at least some of the functions of the control portion 11 may be executed by a program executed via a network.

The touch panel device 1 according to the present embodiment is not limited to the specific configuration illustrated in FIG. 4. The touch panel device 1 is not limited to one device, and may be configured by connecting two or more physically separated devices by wire or wirelessly.

The input light control portion 111 controls the light emitting portion 12 to generate the input light A. Specifically, the input light control portion 111 causes the light emitting portion 12 to generate the input light A of a predetermined wavelength by transmitting a control signal to the light emitting portion 12.

The input light A emitted from the light emitting portion 12 is, for example, light in the infrared region (the wavelength range from 0.78 µm to less than 1000 µm). Since infrared rays are invisible to the user, they do not disturb the display content of the display portion 15 and are therefore preferable. The input light A is not limited to the infrared region, and may be light in a visible light region (the wavelength range from 0.38 µm or more to less than 0.78 µm) or the ultraviolet light region (the wavelength range from 0.1 µm or more to less than 0.38 µm). The wavelength of the input light A is appropriately selected in accordance with the mounting of the touch panel device 1.

The output light detection portion 112 detects the output light B received by the light receiving portion 13. Specifically, the output light detection portion 112 receives a signal indicating the intensity of the output light B received by the light receiving portion 13 from the light receiving portion 13, and by performing processing such as demodulation on the signal, detects the intensity of the output light B.

The relationship reading portion 113 reads a table stored in advance in the storage portion 16, the table indicating the relationship between positions on the panel 14 and the output light B at those positions. The relationship between the positions on the panel 14 and the output light B is defined by obtaining in advance, by calculation or experiment, the respective intensities of the output light B when a user touches each of the plurality of positions on the panel 14. As the intensity, the value of the intensity of the output light B itself may be used, or the value of the intensity change may be used. The value of the intensity change is a value of the difference between the intensity of the output light B when the user has touched a certain position and the intensity of the output light B when the user has not touched the position.

The contact position calculation portion 114 detects a user's contact position on the contact surface 141 of the panel 14 corresponding to the output light B detected by the output light detection portion 112, referring to the table, read by the relationship reading portion 113, indicating the relationship between the position on the panel 14 and the output light B. More specifically, the output light B detected by the output light detection portion 112 is compared with the output light B in the table to determine the contact position of the user.

For example, the contact position calculation portion 114 calculates each difference between the intensity of the output light B detected by the output light detection portion 112 and the plurality of intensities of the output light B in the table read by the relationship reading portion 113.

The differences in the intensities calculated in this way respectively correspond to the distances between the contact position of the user and the plurality of positions in the table read by the relationship reading portion 113. That is, among the plurality of positions in the table, the user is considered to have made contact near a position corresponding to the output light B in the table having a small difference in intensity with the detected output light B. In this way, the contact position calculation portion 114 estimates the user's contact position from a plurality of intensity differences calculated corresponding to a plurality of positions on the contact surface 141 of the panel 14.

When the light receiving portion 13 includes a plurality of light receiving elements, the relationship between a position on the panel 14 and the output light B is defined for each of the plurality of light receiving elements, and the contact position of the user may be determined using these relationships. In this case, for example, the contact position calculation portion 114 calculates the distance between the contact by the user and each light receiving element from the difference between the intensity of the output light B detected by the output light detection portion 112 and the intensity of the output light B at a plurality of positions in relation to each light receiving element. Then, the contact position calculation portion 114 calculates the contact position of the user by performing trilateration using the distance from each light receiving element. Thereby, it is possible to specify the contact position of the user with higher accuracy than when one light receiving element is used.

The output portion 115 outputs the contact position of the user calculated by the contact position calculation portion 114. Specifically, the output portion 115 transmits information indicating the user's contact position calculated by the contact position calculation portion 114 to the host system connected to the touch panel device 1. The host system performs a predetermined process on the basis of the received information indicating the contact position. The output portion 115 may output the information indicating the contact position of the user calculated by the contact position calculation portion 114 by storing the information in the storage portion 16.

[Flowchart of Touch Detection Method]

Figure 5:
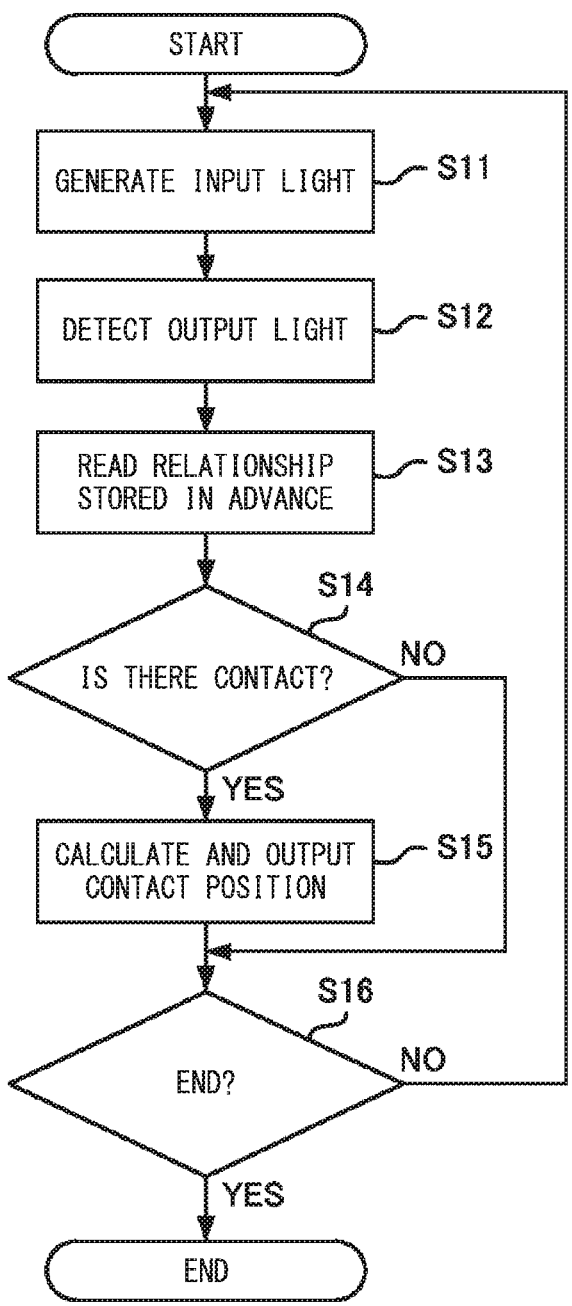
FIG. 5 is a flowchart illustrating the touch detection method executed by the touch panel device according to the first embodiment.

FIG. 5 is a flowchart illustrating the touch detection method executed by the touch panel device 1 according to the present embodiment. The flowchart of FIG. 5 is started by, for example, the touch panel device 1 being activated.

First, the input light control portion 111 controls the light emitting portion 12 to generate the input light A having a predetermined wavelength (S1). The output light detection portion 112 detects the output light B received by the light receiving portion 13 (S12). The output light B detected by the output light detection portion 112 includes the input light A that has passed through the panel 14 while being totally reflected and the reflected light D of the evanescent light C generated near the panel 14.

Next, the relationship reading portion 113 reads a table, stored in advance in the storage portion 16, indicating the relationship between each position on the panel 14 and the output light Bat that respective position (S13). The contact position calculation portion 114 compares the output light B detected by the output light detection portion 112 in Step S12 with the table, read by the relationship reading portion 113 in Step S13, indicating the relationship between a position on the panel 14 and the output light B. With this comparison, a determination is made as to whether or not the user made contact with the panel 14.

When the contact position calculation portion 114 has determined that the user is not touching the panel 14 (NO in S14), the process proceeds to Step S16 without outputting the contact position of the user. When it is determined that the user is touching the panel 14 (YES in S14), the contact position calculation portion 114 calculates the contact position of the user from the detected output light B and relationship between the position on the panel 14 and the output light B. Then, the output portion 115 outputs the contact position of the user calculated by the contact position calculation portion 114 (S15).

If a predetermined end condition (for example, the end operation of the touch panel device 1 being performed) is not satisfied (NO in S16), the touch panel device 1 returns to Step S11 and repeats the process. If the predetermined end condition is satisfied (YES in S16), the touch panel device 1 ends the process.

[Method of Suppressing False Detection]

In the present embodiment, for example, the following first to eighth methods can be considered in order to suppress erroneous detection of the contact position.

As a first method, the light emitting portion 12 may be configured to emit the input light A having a wavelength near 750 nm or a wavelength near 900 nm. Sunlight hardly contains light having a wavelength near 750 nm and a wavelength near 900 nm. Therefore, by using the input light A having a wavelength near 750 nm or a wavelength near 900 nm, the influence of sunlight can be suppressed.

As a second method, the light emitting portion 12 may be configured to emit the input light A having a plurality of wavelengths selected from the infrared region, the visible light region, and the ultraviolet region. When noise due to ambient light or the like occurs, the probability of the same effect occurring for a plurality of wavelengths is low. On the other hand, when contact by the user is actually performed, the same contact position is calculated for any of the plurality of wavelengths.

Therefore, the input light control portion 111 sequentially generates the input light A of each wavelength from the light emitting portion 12, and the output light detection portion 112 detects the output light B for each wavelength of the input light A. Then, the contact position calculation portion 114 calculates the contact position for each wavelength of the input light A. Then, when the contact positions calculated for the plurality of wavelengths of the input light A are the same or approximate, the contact position calculation portion 114 determines any or an average value of the contact positions as the correct contact position. If the contact positions of the plurality of wavelengths are significantly different, the contact position calculation portion 114 determines that no contact has been made. By sequentially using input light A of a plurality of wavelengths in this manner, erroneous detection of contact due to noise can be suppressed.

As a third method, the input light control portion 111 may control the light emitting portion 12 to emit the input light A intermittently by pulse driving. In this case, the output light detection portion 112 calculates the contact position by using a value obtained by subtracting the intensity of the output light B when the input light A is not generated from the intensity of the output light B when the input light A is generated. Thereby, light from the outside of the panel 14 and from the display portion 15 detected by the output light detection portion 112 when the input light A is not generated can be excluded from calculation of the contact position. With such a configuration, it is possible to calculate the contact position while reducing the influence of environmental light (external light) and the content displayed by the display portion 15.

As a fourth method, when the light receiving portion 13 detects the output light B, the display portion 15 may stop (momentarily interrupt) the generation of light (backlight) for display. With such a configuration, since light for display is not mixed into the output light B used for calculation at the contact position, erroneous contact detection can be suppressed. Moreover, the display portion 15 may momentarily interrupt only light of a specific wavelength (for example, any one of red light, green light, and blue light) among the light for display. In this case, the light emitting portion 12 uses light of a specific wavelength as the input light A. With such a configuration, even when light in the visible light region is used as the input light A, erroneous detection of contact by light for display can be suppressed. Furthermore, since the momentary interruption of the display is performed only in a specific color, it is difficult interfere with the user's viewing of the display.

As a fifth method, the contact position calculation portion 114 may determine the presence or absence of contact on the basis of the magnitude of the change of the output light B. For example, when apart other than the user's finger, such as a palm, touches the panel 14, the user often does not intend to perform an operation and so such an action is preferably regarded as not making contact. Therefore, when the magnitude of the change in intensity of the output light B detected by the output light detection portion 112 is equal to or greater than a predetermined threshold, the contact position calculation portion 114 determines that contact has not been performed. The output portion 115 outputs the contact position according to the determination. Thereby, a contact of a large area due to the palm of the hand or the like can be excluded from the output of the contact position.

As a sixth method, the input light control portion 111 performs area driving of the light emitting portion 12 so as to input the input light A from the light emitting portion 12 to only a part of the panel 14, such as a part near the finger, and turn off the light emitting portion 12 in the other parts. In this case, the input light control portion 111 estimates the portion close to the finger from the size (height or the like) of the human body and the arrangement of the touch panel device 1 and specifies an area where the input light A is to be input. Thereby, the touch panel device 1 can detect contact of a finger with high accuracy.

As a seventh method, the contact position calculation portion 114 may determine the presence or absence of contact on the basis of a time-series pattern of change in the output light B. When the user's finger touches the panel 14, normally the contact area gradually increases from the fingertip to the finger pad. For that reason, a time-series pattern appears in the change of the output light B.

Therefore, the contact position calculation portion 114 defines in advance a time-series pattern of the change of the output light B corresponding to the contact of the finger. The contact position calculation portion 114 acquires the intensity of the output light B detected by the output light detection portion 112 in a time series, and determines whether the intensity of the output light B in the time series includes a predefined time series pattern. Then, the contact position calculation portion 114 determines that a finger contact has been performed when the intensity of the time-series output light B includes the predefined time-series pattern, and otherwise determines that a finger contact has not been performed. The output portion 115 outputs the contact position according to the determination. By determining the presence or absence of contact in this way on the basis of the time-series pattern of the change in the output light B, it is possible to detect a finger contact with high accuracy.

As an eighth method, the touch panel device 1 may be further provided with a capacitance measuring portion that measures the capacitance of the panel 14. The capacitance measuring portion defines in advance the capacitance corresponding to contact of a human body. The capacitance measuring portion measures the capacitance of the contact surface 141 of the panel 14. Then, when the measured capacitance matches the capacitance corresponding to the predefined contact of a human body, the capacitance measuring portion determines that contact by the user has been performed, and otherwise that contact by the user has not been performed. The output portion 115 outputs the contact position according to the determination. By determining the presence or absence of contact on the basis of capacitance in this way, it is possible to exclude the contact of dust or small animals other than the user and so detect the contact of the user with high accuracy.

Effects of First Embodiment

As described above, the touch panel device 1 according to the present embodiment calculates the contact position of the user on the panel 14 on the basis of the reflected light D of the evanescent light C generated on the surface of the panel 14. According to such a configuration, since a transparent electrode for detecting a contact position is not required, the cost is lower than that of a conventional capacitive-type touch panel, and the light transmittance is higher. Further, since it is not necessary to arrange a large number of sets of the light emitting portion 12 and the light receiving portion 13 along the edge of the screen, the cost is lower than that of a conventional infrared-type touch panel.

Second Embodiment

In the first embodiment, a light receiving element is used as the light receiving portion 13, whereas in the present embodiment, an imaging device is used as the light receiving portion 13. Other constitutions and processes are the same as those of the first embodiment.

[Constitution of Touch Panel Device 1]

Figure 6:
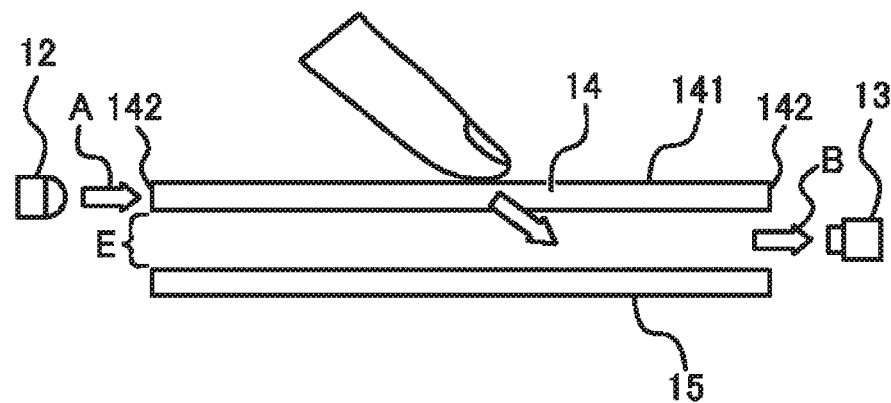
FIG. 6 is a side view showing a touch panel device according to a second embodiment.

FIG. 6 is a side view of the touch panel device 1 according to the present embodiment. In FIG. 6, the size of each constituent member is adjusted for recognizability, and does not correspond to the actual size. The display portion 15 extends along the panel 14 with a gap E of a predetermined size therebetween.

The light receiving portion 13 has an imaging device (camera) that transmits an image of the panel 14 captured from the gap E to the control portion 11. The light receiving portion 13 is provided at a position where the output light B output from the gap E between the panel 14 and the display portion 15 can be detected.

[Explanation of Touch Detection Method]

Figure 7:
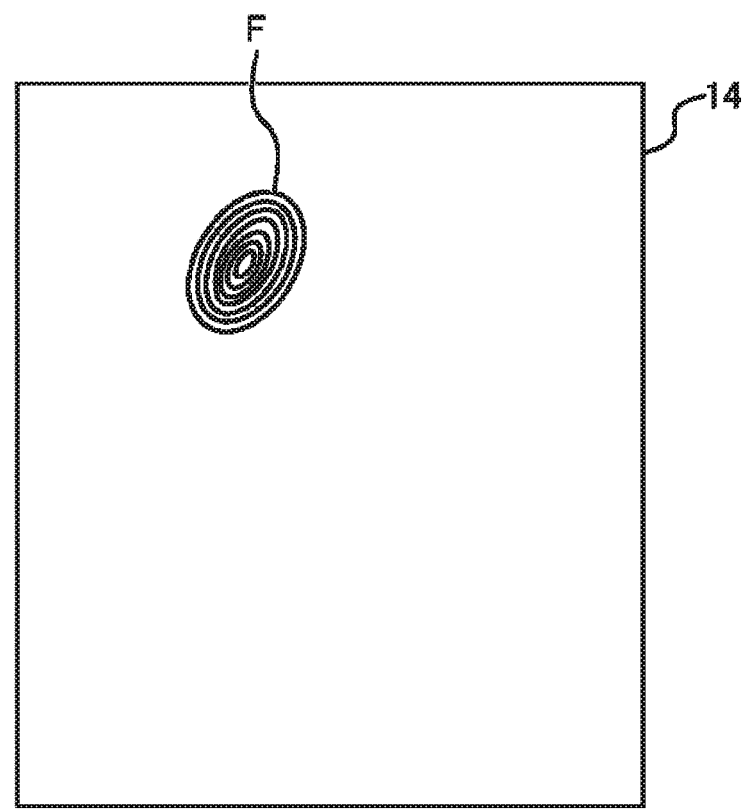
FIG. 7 is a front view showing the touch detection method by the touch panel device according to the second embodiment.

FIG. 7 is a front view of a touch detection method by the touch panel device 1 according to the present embodiment. FIG. 7 shows an image obtained by performing trapezoidal correction on an image obtained by imaging the panel 14 with the imaging device of the light receiving portion 13. That is, since the light receiving portion 13 is provided at the end of the gap E between the panel 14 and the display portion 15, when the panel 14 is imaged, trapezoidal distortion occurs in the panel 14 in the image. For that reason, the touch panel device 1 eliminates the trapezoidal distortion of the panel 14 in the image by performing the trapezoidal correction on the image captured by the light receiving portion 13.

As described above, the thickness of the evanescent light C is about several hundred nm. On the other hand, the height of a fingerprint (that is, the difference between the peaks and the valleys of a fingerprint) is about 0.1 mm. As described above, since the height of the fingerprint is substantially larger than the thickness of the evanescent light C, when a finger touches the panel 14 the evanescent light C is reflected at the peak portions (convex portions) of the fingerprint, but not reflected at the valley portions (concave portions). Therefore, when the light receiving portion 13 captures an image of the panel 14 with which the user's finger is in contact, the reflected light D of the evanescent light C appears in the image as the shape of a fingerprint F (the peaks of the fingerprint) as shown in FIG. 7. Therefore, by capturing the image of the panel 14, the touch panel device 1 according to the present embodiment can detect the fingerprint in addition to the contact position from the output light B including the reflected light D of the evanescent light C.

[Flowchart of Touch Detection Method]

Figure 8:
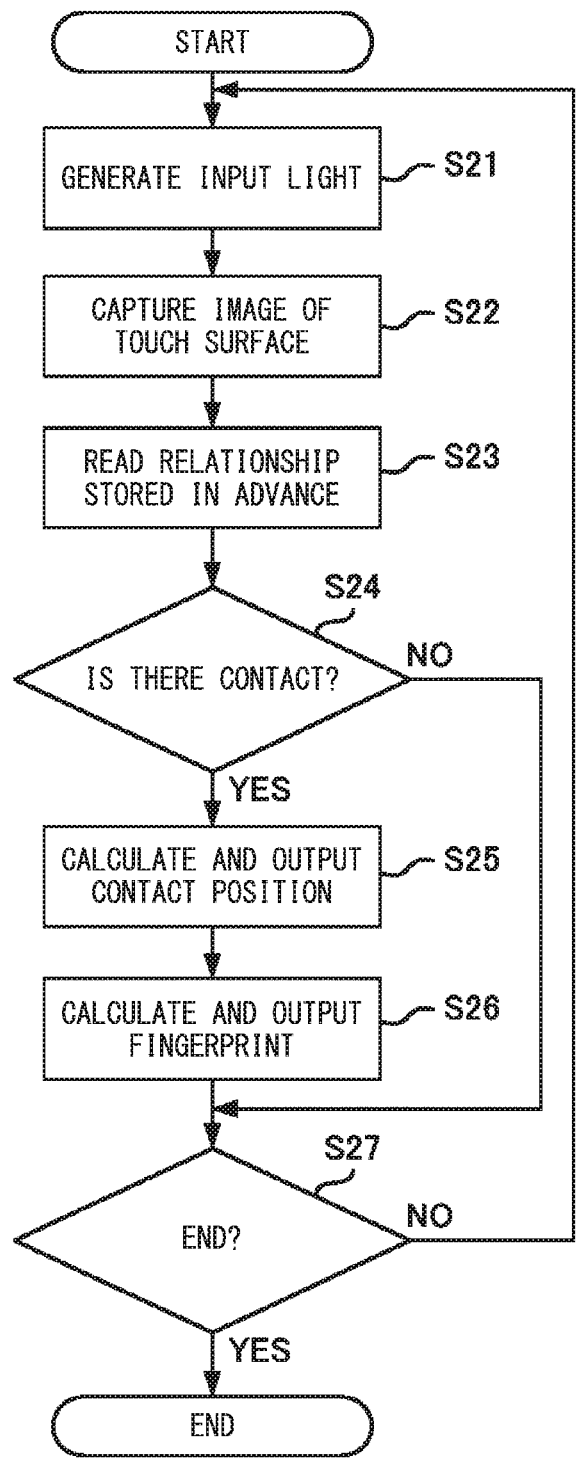
FIG. 8 is a flowchart illustrating the touch detection method executed by the touch panel device according to the second embodiment.

FIG. 8 is a flowchart illustrating the touch detection method executed by the touch panel device 1 according to the present embodiment. The flowchart in FIG. 8 is started when, for example, the touch panel device 1 is activated.

First, the input light control portion 111 controls the light emitting portion 12 to generate the input light A having a predetermined wavelength (S21). The output light detection portion 112 causes the light receiving portion 13 to image the panel 14 and obtains an image (S22). At this time, the output light detection portion 112 performs a predetermined trapezoidal correction on the captured image. The output light B including the reflected light D of the evanescent light C generated near the panel 14 appears in the image of the panel 14.

Next, the relationship reading portion 113 reads a table, stored in advance in the storage portion 16, indicating the relationship between positions on the panel 14 and the output light B at those positions (S23). In the present embodiment, the relationship between each position on the panel 14 and the output light B is defined by obtaining in advance, through calculation or experimentation, the position of the output light B in an image captured when the user makes contact with each of a plurality of positions on the panel 14.

The contact position calculation portion 114 determines whether or not a user is making contact with the panel 14 by comparing the image captured by the output light detection portion 112 in Step S22 with the table, read by the relationship reading portion 113 in Step S23, showing the relationship between each position on the panel 14 and the output light B.

If the contact position calculation portion 114 determines that the user is not in contact with the panel 14 (NO in Step S24), the process proceeds to Step S27 without outputting the contact position of the user. If the contact position calculation portion 114 determines that the user is in contact with the panel 14 (YES in Step S24), the contact position calculation portion 114 calculates the contact position of the user from the detected output light B and the relationship between the position on the panel 14 and the output light B. That is, the contact position calculation portion 114 calculates the position on the panel 14 associated with the position of the output light B in the image, in the relationship read by the relationship reading portion 113, as the contact position of the user. The output portion 115 outputs the contact position of the user calculated by the contact position calculation portion 114 (S25).

Further, the contact position calculation portion 114 detects, as the fingerprint F of the user, a region of a predetermined size centered on the contact position calculated in Step S25 in the image captured by the output light detection portion 112 in Step S22. Then, the output portion 115 outputs the fingerprint F of the user detected by the contact position calculation portion 114 (S26).

If the predetermined end condition (for example, the end operation of the touch panel device 1 being performed) is not satisfied (NO in S27), the touch panel device 1 returns to Step S21 and repeats the process. If the predetermined end condition is satisfied (YES in S27), the touch panel device 1 ends the process.

Effect of Second Embodiment

In addition to exhibiting the same effect as the first embodiment, the present embodiment can also detect the user's fingerprint simultaneously with the contact position. Since the reflected light D of the evanescent light C is also used for fingerprint detection, a device for detecting a contact position and a fingerprint can be realized at low cost. The touch panel device 1 according to the present embodiment can be suitably used for a device such as an ATM (automatic teller machine) that requires both reception of a user operation and reception of a fingerprint for biometric authentication.

The present invention has been described above using embodiments. However, the technical scope of the present invention is not limited to the scope described in the above embodiments, and various modifications and changes can be made within the scope of the gist. For example, the specific embodiment of the distribution/integration of the device is not limited to the above-described embodiments, and a constitution is possible that functionally or physically distributes/integrates all or a part thereof in arbitrary units. Further, a new embodiment generated by arbitrary combination of the plurality of embodiments is also included in the embodiments of the present invention. The effect of the new embodiments produced by the combination has the effect of the original embodiment.

The control portion 1 (processor) of the touch panel device 1 is a main component of each step (process) included in the touch detection method illustrated in FIGS. 5 and 8. That is, the control portion 11 reads a touch detection program for executing the touch detection method shown in FIGS. 5 and 8 from the storage portion 16 and, by executing the touch detection program, controls each portion of the touch panel device 1. Thereby, the touch detection method shown in FIGS. 5 and 8 is executed. Some of the steps included in the touch detection method shown in FIGS. 5 and 8 may be omitted, the order between the steps may be changed, and a plurality of steps may be performed in parallel.

DESCRIPTION OF THE REFERENCE SYMBOLS

1: Touch panel device
11: Control portion
12: Light emitting portion
13: Light receiving portion
14: Panel
15: Display portion
16: Storage portion

The invention claimed is:

1. A touch panel device comprising:
 a panel having a contact surface for receiving a contact;
 a light emitting portion that inputs, to the panel, input light that is transmitted through the panel;
 a light receiving portion that detects output light including reflected light of evanescent light that has been generated, on the contact surface, from the input light; and
 a control portion that calculates and outputs a contact position where a contact was received on the contact surface on the basis of the intensity of the output light detected by the light receiving portion and a relationship, stored in advance, between positions on the contact surface and the intensity of the output light respectively corresponding thereto, wherein the control portion calculates the contact position using a value of an intensity change obtained by subtracting the intensity when the light emitting portion is not emitting the input light from the intensity when the light emitting portion is emitting the input light.

2. The touch panel device according to claim 1, wherein the light receiving portion comprises a plurality of light receiving elements, and
the control portion calculates a distance from each of the light receiving portions to the contact position using the intensity of the output light detected by each of the plurality of light receiving elements, and calculates the contact position using the plurality of distances related to the plurality of light receiving elements.

3. The touch panel device according to claim 1, wherein the light receiving portion is a camera that obtains an image by capturing the reflected light; and
the control portion calculates the contact position from the image acquired by the camera.

4. The touch panel device according to claim 3, wherein the control portion detects a fingerprint of the contact from the image acquired by the camera, and outputs the fingerprint along with the contact position.

5. The touch panel device according to claim 1, wherein the light emitting portion emits the input light having a wavelength of 0.78 μm or more and less than 1000 μm.

6. The touch panel device according to claim 1, wherein the light emitting portion emits the input light having a plurality of wavelengths.

7. The touch panel device according to claim 1, wherein the control portion determines the presence or absence of the contact on the basis of a magnitude of a change in the output light.

8. The touch panel device according to claim 1, wherein the control portion determines the presence or absence of the contact on the basis of a time-series pattern of a change in the output light.

9. The touch panel device according to claim 1, further comprising a capacitance measuring portion that measures the capacitance of the contact surface,
wherein the control portion determines the presence or absence of the contact on the basis of the capacitance measured by the capacitance measuring portion.

10. The touch panel device according to claim 1, wherein the light emitting portion inputs the input light to an end surface surrounding the contact surface of the panel.

11. The touch panel device according to claim 10, wherein the light receiving portion detects the output light output from the end surface opposite to the light emitting portion.

12. The touch panel device according to claim 10, further comprising a display portion for displaying an image, the display portion extending along the panel with a gap therebetween,
wherein the light receiving portion detects the output light output from the gap between the panel and the display portion.

* * * * *